United States Patent Office 3,041,305
Patented June 26, 1962

3,041,305
PREPARATION OF UNSATURATED POLYESTER REACTION PRODUCT OF A DIHYDRIC ALCOHOL AND AN UNSATURATED POLYMER, AND RESULTING PRODUCTS
Klaus Tessmar, Darmstadt, and Fritz Kollinsky, Darmstadt-Eberstadt, Germany, assignors to Rohm & Haas G.m.b.H., Darmstadt, Germany
No Drawing. Filed Mar. 19, 1958, Ser. No. 722,384
Claims priority, application Germany Apr. 13, 1954
16 Claims. (Cl. 260—45.4)

This invention relates to polyester resins.

As is well known, polyester resins may be made by condensing dibasic carboxylic acids (or their esters) in which either the acids or the alcohols or both contain double bonds capable of polymerization, with dihydric alcohols to produce unsaturated polyesters (with the simultaneous formation of water or monohydric alcohol), said unsaturated polyesters having an "alkyd" structure comprising a series of alternating dihydric alcohol and dibasic acid residues joined together by ester linkages. These unsaturated polyesters are transformed into polyester resins by conjoint polymerization with other unsaturated compounds, e.g., compounds containing the vinylidene ($CH_2=C=$) or vinyl ($CH_2=CH$) group. Such processes and products are disclosed, for example, in the United States Patent No. 2,255,313 of Ellis. In the following, the products of condensation shall be indicated as "unsaturated polyesters" while the products of conjoint polymerization shall be named "polyester resins."

It has been found that polyester resins having the most favorable qualities are obtained if the unsaturated polyesters formed in the first stage of the reaction are formed by condensation of dihydric alcohols with certain types of unsaturated esters and/or the unsaturated polybasic carboxylic acids corresponding to such esters which are more fully described below.

The unsaturated esters and/or acids referred to are produced by "oligomerization" of esters of methacrylic acid (with alcohols having 1–4 carbon atoms). Hereinafter, the term oligomerization shall denote the formation of low molecular weight products of polymerization from the monomeric esters of methacrylic acids whereby a new compound designated hereinafter as being an oligomer, is created from 2–10 molecules of a monomeric methacrylic acid ester. The reaction is believed to take place between the unsaturated linkages of the molecules, and the oligomers have at least one carbon to carbon double bond within the molecule which is capable of further polymerization. They are to be distinguished from products which are formed merely by reaction between the carboxyl or ester groups.

The production of such compounds has been described, for example, in the United States Patents Nos. 2,244,645 and 2,232,785 as well as in the German patent specifications Nos. 855,554 and 903,932. For example, U.S. Patent No. 2,232,785 discloses polymers of the type represented by methyl methacrylate, N-butyl methacrylate, the others having a molecular weight of from 2 to about 6 or 8 times that of the original monomer. Likewise, thermal splitting of the polymeric methacrylic acid esters and acids, respectively, will result in the creation, though in small quantities, of oligomeric products to be used under the invention herein. By saponification of the oligomeric esters in the known manner, there are obtained the corresponding polybasic carboxylic acids. If, for example, the methyl ester of methacrylic acid is dimerized, an unsaturated diester with the boiling point 106°/5 mm. is obtained. By saponification, there is obtained the corresponding dicarboxylic acid which has a melting point of 88°.

The oligoesters and the corresponding oligocarboxylic acids, respectively, may be condensed, possibly in a mixture with other unsaturated acids, such as itaconic acid or with dicarboxylic acids which do not have any polymerizable double bonds, for instance, adipic acid, phthalic acid, tetrahydro phthalic acid, and the corresponding dicarboxylic acid anhydrides, with a dihydric alcohol or alcohols. We prefer that, of the total quantity of polybasic acid present, at least about 10 percent and preferably at least 25 percent based on the number of carboxyl groups should be the oligomeric material described above. However, lower percentages may be used, and it is our invention to include such uses within the scope of the invention. The following alcohols may be used: ethylene glycol, diethylene glycol, triethylene glycol, butane-diol-1,4; hexane diol 1,6, thio diglycol and butene 2,3 diol 1,4. The alcohol may contain double bonds capable of further polymerization.

Condensation is effected in the known manner, for instance at increased temperature and under exclusion of the oxygen of the air, and the removal of the water and/or the primary alcohol, respectively, which are formed in the course of condensation. Suitable procedures are disclosed in the Ellis patent referred to above. Catalysts and stabilizers acting as esterification agents or as agents for the interchange of ester radicals preventing undesired polymerization at the double bond, may possibly be added.

The aforementioned oligomeric esters may also be transformed directly by means of a dihydric alcohol whereby the unsaturated polyesters are formed by alcoholysis, suitably in the presence of catalysts.

The relative amounts of dihydric alcohol and polybasic acid present in the esterification mixture are subject to considerable variation, depending upon the particular reactants and the properties desired in the product. Suffice it to say that the amounts and the conditions are such as to effect reaction of the OH group of the alcohol in amount equal to the COOH group of the acid to produce high molecular weight condensation products through a multiplicity of ester linkages. If esters and carboxylic acids, respectively, are used in accordance with the invention herein, it may become necessary to use a surplus of dihydric alcohols and maintain such conditions of reaction as to prevent the formation of insoluble and infusible products, i.e., avoid premature jellying.

The oligomeric compounds created by oligomerization of esters of the methacrylic acid may be used individually (singly), such as dimers, trimers, tetramers, etc. or in mixtures.

The unsaturated esters obtained in accordance with the above description are characterized by their solubility in the monomers used for the manufacture of polyester resins as well as by their inclination to form copolymers with these monomers. It is known that methacrylic acid methyl ester may be used as a monomer in the polyester resin manufacture. However, in the case of most of unsaturated polyesters known in the prior art, the solubility and the capability of mixed polymerization of the methacrylic acid ester is unsatisfactory. For example, a polyester consisting of 1 mol phthalic acid anhydride
1 mol maleic acid anhydride
2 mols butane-diol 1,4 having the acid number 45 is only very poorly soluble in monomeric methyl methacrylate. In case such a solution thus containing only a small part of unsaturated polyester is polymerized, a muddy (cloudy) product of mechanically unsatisfactory characteristics is obtained. In contrast thereto, the unsaturated polyesters which are used in accordance with the invention herein are characterized by their good solubility in methacrylic acid methyl ester and by their satisfactory tendency towards mixed polymerization.

There should also be mentioned the negligible color of the unsaturated polyesters produced in accordance with the invention, particularly because corresponding products manufactured from the unsaturated polybasic carboxylic acids known to date show a definite color which is unsuitable for many practical purposes.

After preparing the unsaturated polyester described above, it is incorporated with the requisite amount of a monomeric unsaturated polymerizable compound containing a member of the group consisting of a vinyl and a vinylidene group polymerizable therewith. Such monomeric compounds include those corresponding to the following formula:

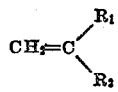

where $R_1$ is a negative group such as aryl, vinyl, ethynyl, carboxyl, halogen, O—CO—alkyl (acyloxy), —CO—alkyl, —CO.O.alkyl (carbalkoxy), alkoxy aldehydo, nitrile or halovinyl, and $R_2$ represents hydrogen or an alkyl group having 1–4 carbon atoms. Specific examples of suitable vinyl compounds include acrylic and methacrylic compounds, styrene, vinyl ether, vinyl esters, vinyl ketones, etc.

By using and/or the additional use of the aforementioned polymerizable monomeric compounds which possess at least 2 carbon to carbon double bonds per molecule, for example, divinyl benzene, glycol dimethacrylate or triallyl cyanurate, as monomers within the meaning of the method described, the mechanical qualities of the resulting polyester resins, particularly their hardness and heat resistance, may be increased considerably. The unsaturated polyesters are notable for their compatibility with the monomeric unsaturated compounds and with mixtures of such monomers.

The copolymerization reaction between the unsaturated polyesters and monomeric compound is carried out in solution, and hence the proportion of unsaturated polyesters and monomers to be used depends somewhat on the miscibility of the two types of materials. If the polyester and/or the unsaturated monomer is a solid at room temperature, it still can be used, provided it melts and/or dissolves under the reaction conditions. The homegeneity of the copolymer produced may be affected by such proportion, although in general the copolymers have superior properties to those which are prepared from other types of starting materials. Within the limits of solubility and the other criteria, suitable proportions may be found within the range from not substantially greater than 95 parts of unsaturated polyester per 5 parts of monomer to not substantially less than 5 parts of unsaturated polyester per 95 parts of monomer. We prefer to use 55 to 80 percent by weight of polyester and 45 to 20 percent by weight of monomer.

Thus, the polybasic carboxylic acids and their esters, respectively, if used in accordance with the method herein, increase to a considerable extent the possibilities of manufacturing unsaturated polyesters by the condensation of unsaturated polycarboxylic acid components with dihydric alcohols for the most diversified purposes. Polyester resins manufactured in accordance with the invention herein, possibly in combination with fiber glass as a filler, may be used to manufacture the most diverse objects, such as bodies of motorcars and of boats, parts of airplanes, roof coverings, wall coverings and shutters. The afore-described polyester resin may likewise be used for electrotechnical casting, for pressing and as moulding resin in the manufacture of sculptured articles, art objects as well as articles for everyday use, for religious use as well as for the imbedding of biological preparations or technical products. It is possible to add filling agents and dyes in the manner customary for the technique of polyester resin treatment. In cases where thermal stability is most important, the afore-described polyester resins are frequently superior to other similar artificial preparations.

*Example 1*

1 mol, 172 grams, of the unsaturated dicarboxylic acid having a melting point of 88° formed by dimerization of methacrylic acid methyl ester with subsequent saponification, is condensed with 1 mol, 62 grams, of ethylene glycol. To start with, the mixture is heated for two hours under simultaneous stirring until it reaches a temperature of 150°. During this process, a weak carbonic acid stream is sent through the mixture so as to exclude the oxygen of the air and at the same time to remove the water created by the reaction. Within four hours, the temperature is subsequently increased to 200°. A practically colorless unsaturated polyester having the acid number 38 and appearing upon cooling as a soft mass which is no longer capable of flowing, is being obtained.

Further treatment may be effected by dissolving 70 parts of this polyester in 30 parts of methacrylic acid methyl ester. There results a highly viscous clear solution which can be subjected to the conditions of polymerization customary in the case of polyester resins.

*Example 2*

An unsaturated polyester is produced by condensation of 2 mols of unsaturated dicarboxylic acid resulting from the dimerization of methacrylic acid methyl ester with subsequent saponification, 0.6 mol hexane diol-1,6 and 1.4 mols butane-diol-1,4. The method remains the same as described in Example 1 except that condensation is effected at 180° and that subsequently the temperature is increased to 200° within four hours. The unsaturated polyester thus obtained has an acid number of 42 and constitutes a semisolid, soft sticky mass.

*Example 3*

In accordance with the method described in Example 2, an unsaturated polyester is obtained by esterification of 0.66 mol of the unsaturated dicarboxylic acid obtained by dimerization of methacrylic acid methyl ester with subsequent saponification, 1.34 mols of adipic acid and 2.05 mols of butane diol-1,4. The consistency of the polyester is that of a thick liquid, which is clear and has a slightly yellowish color. Its acid number amounts to 8.5. 65 parts of this polyester are, for example, soluble in 35 parts of methacrylic acid-cyclo-hexane ester. Such a solution may be transformed into polyester resins in the known manner.

*Example 4*

As starting substance, there are used the unsaturated dicarboxylic acid resulting from the dimerization of methacrylic acid methyl ester and subsequent saponification (about 0.3 mol), 0.3 mol of itaconic acid, 0.4 mol of tetrahydro phthalic acid anhydride and 1.0 mol of diethylene glycol. Subsequent to six hours of condensation at 180° in accordance with Example 1, there is obtained a semisolid polyester of sticky consistency with an acid number of 34.

*Example 5*

Methacrylic acid butyl ester is dimerized in accordance with German Patent Specification No. 903,932, published October 5, 1950 and the unsaturated dicarboxylic acid having a melting point of 88° is separated from the product of the reaction by saponification with the equivalent amount of aqueous soda lye and subsequent acidifying with sulphuric acid.

1 mol, 172 grams, of said dicarboxylic acid together with 1 mol, 90 grams of butane-diol-1,4 is heated to a temperature of 150° for two hours in a stream of nitrogen. Subsequently the mixture is heated for two hours up to 200°. Thereafter, the mixture of the reaction is cooled to 100° and thinned by means of a mixture of equal parts of methacrylic acid-3-methoxybutyl ester and methacrylic acid allyl ester, such mixture weighing one-half of the weight of the former mixture. In the course of thinning, said mixture is further cooled under continued stirring, until it reaches room temperature. The medium viscous solution thus obtained may be transformed into a polyester resin by addition of the customary agent accelerating polymerization.

*Example 6*

An oligomerization mixture produced from methacrylic acid methyl ester in accordance with German Patent Specification No. 903,932 from which the untransformed methacrylic acid methyl ester has been removed, consisting of 79% dimeric methacrylic acid methyl ester and 17% of trimeric methacrylic acid methyl ester in addition to higher oligomers, is used for the manufacture of an unsaturated polyester.

240 parts of the oligomerization mixture, 206 parts of diethylene glycol, 62 parts of ethylene glycol, 2 parts of zinc borate are heated to 210° within 6 hours and any resulting methanol is removed continuously. The unsaturated polyester thus obtained (acid number: 0, OH number: 21) after removal of the catalyst, may be thinned with methyl methacrylate for the purpose of further treatment. The solution is clear, practically colorless and highly viscous.

*Example 7*

The oligomerization mixture of Example 6 is saponified with soda lye after the nontransformed methyl methacrylate has been removed and the corresponding carboxylic acids are freed. 204 parts of the saponified oligomerization mixture, 148 parts of phthalic acid anhydride are esterified with 62 parts of ethylene glycol, 110 parts of butylene glycol-1.4 under addition of 1.5 parts p-toluene sulfo acid. The polyester is of slightly yellow color, acid number: 31, OH number: 24, and can be thinned to 70% by means of methyl methacrylate. Polyester resin is created by polymerization in the customary manner.

*Example 8*

60 parts of the unsaturated polyester condensation polymer prepared by the procedure described in Example 1 are mixed with 40 parts of styrene, which is then subjected to copolymerization to produce a solid product having desirable properties.

*Example 9*

72 parts of the polyester condensation polymer prepared according to Example 3 are mixed with 28 parts of alpha methyl styrene to produce a solution which is then copolymerized to produce a desirable solid copolymer.

*Example 10*

The procedure described in Example 6 is repeated except that the methyl methacrylate is replaced by methyl isopropyl ketone as the unsaturated monomeric material for joint polymerization. A solid copolymer having the desirable properties described above is prepared.

This application is a continuation-in-part of our copending application Serial No. 500,666 filed April 11, 1955, now abandoned, and we do not intend that the specific descriptions and examples presented herein shall impose limitations on the claims, but we intend to include within the scope of the claims all modifications and equivalents thereof.

We claim:

1. The method of manufacture of polyester resins which comprises reacting under condensation reaction conditions the following (1) a dihydric alcohol and (2) an unsaturated polymer of 2–8 molecules of a monomer of the group consisting of an ester of methacrylic acid and a saturated aliphatic monohydric alcohol having 1–4 carbon atoms, and the carboxylic acid produced by hydrolysis of said ester to produce an unsaturated polyester condensation polymer, continuing said condensation process to an advanced stage of esterification but short of insolubility and infusibility of the product in an organic solvent, incorporating said unsaturated polyester condensation polymer with a monomeric unsaturated polymerizable compound containing a member of the group consisting of a vinyl and a vinylidene group in an amount that is miscible therewith, said amount being not greater than about 95 parts of said unsaturated polyester condensation polymer to 5 parts of said monomeric compound, and not less than about 5 parts of said unsaturated polyester condensation polymer to 95 parts of said monomeric compound, to form a solution, and subjecting said solution to conjoint polymerization.

2. The method of manufacture of polyester resins which comprises preparing an unsaturated polymer of 2–8 molecules of an ester of methacrylic acid and a saturated aliphatic monohydric alcohol having 1–4 carbon atoms, reacting said polymer under condensation reaction conditions with the simultaneous formation of monohydric alcohol to an advanced stage of esterification with a dihydric alcohol to produce an unsaturated polyester condensation polymer, continuing said condensation process to an advanced stage of esterification but short of insolubility and infusibility of the product in an organic solvent, incorporating said unsaturated polyester condensation polymer with a monomeric unsaturated polymerizable compound containing a member of the group consisting of a vinyl and a vinylidene group in an amount that is miscible therewith, said amount being not greater than about 95 parts of said unsaturated polyester condensation polymer to 5 parts of said monomeric compound, and not less than about 5 parts of said unsaturated polyester condensation polymer to 95 parts of said monomeric compound, to form a solution, and subjecting said solution to conjoint polymerization.

3. The method which comprises reacting under condensation reaction conditions, the following (1) a dihydric alcohol and (2) an unsaturated polymer of 2–8 molecules of a monomer of the group consisting of an ester of methacrylic acid and a saturated aliphatic monohydric alcohol having 1–4 carbon atoms, and the carboxylic acid produced by hydrolysis of said ester to produce an unsaturated polyester condensation polymer, and continuing said condensation process to an advanced stage of esterification but short of insolubility and infusibility of the product in an organic solvent.

4. The method which comprises preparing an unsaturated polymer of 2–8 molecules of an ester of methacrylic acid and a saturated aliphatic monohydric alcohol having 1–4 carbon atoms, reacting said polymer under condensation reaction conditions with the simultaneous formation of monohydric alcohol to an advanced stage of esterification with a dihydric alcohol to produce an unsaturated polyester condensation polymer, and continuing said condensation process to an advanced stage of esterification but short of insolubility and infusibility of the product in an organic solvent.

5. The method according to claim 1 in which said unsaturated polymer is formed from methacrylic acid methyl ester.

6. A method according to claim 5 in which said monomeric compound is a methacrylic acid ester.

7. A method according to claim 1 in which the amount of unsaturated polyester condensation polymer is not greater than about 80 parts to 20 parts of monomeric compound, and not less than about 55 parts to 45 parts of said monomeric compound.

8. A method according to claim 6 in which said monomeric compound is methacrylic acid methyl ester.

9. A method according to claim 2 in which said monomeric compound is a methacrylic acid ester.

10. A method according to claim 9 in which said monomeric compound is a methacrylic acid methyl ester.

11. A method according to claim 1 in which said monomeric compound possesses at least 2 non-aromatic double bonds in the molecule.

12. A method according to claim 2 in which said monomeric compound possesses at least 2 non-aromatic double bonds in the molecule.

13. A product prepared according to the method of claim 1.

14. A product prepared according to the method of claim 10.

15. A product prepared according to the method of claim 3.

16. A product prepared according to the method of claim 4.

References Cited in the file of this patent

UNITED STATES PATENTS

| | | |
|---|---|---|
| 2,109,877 | Barrett | Mar. 1, 1938 |
| 2,232,785 | Howk | Feb. 25, 1941 |
| 2,244,487 | Crawford | June 3, 1941 |
| 2,244,645 | Jacobson | June 3, 1941 |
| 2,255,313 | Ellis | Sept. 9, 1941 |
| 2,602,079 | De Groote et al. | July 1, 1952 |
| 2,742,494 | Mraz | Apr. 17, 1956 |

OTHER REFERENCES

"Textbook of Polymer Chemistry," Billmeyer, Interscience Publishers Inc., New York (1957), page 196 relied on.